United States Patent [19]

Anello et al.

[11] 3,723,507
[45] Mar. 27, 1973

[54] PERFLUORO CYCLOALKYL ACRYLATES

[75] Inventors: Louis Gene Anello, Basking Rodge; Richard P. Sweeney, Randolph Township, Dover, both of N.J.

[73] Assignee: Allied Chemical Corporation, New York, N.Y.

[22] Filed: June 8, 1970

[21] Appl. No.: 57,006

Related U.S. Application Data

[62] Division of Ser. No. 466,831, June 24, 1967, Pat. No. 3,520,863.

[52] U.S. Cl. ............................................. 260/486 H
[51] Int. Cl. ................................................ C01c 69/52
[58] Field of Search .................................. 260/486 H

[56] References Cited

UNITED STATES PATENTS 3,384,628    5/1968    Pittman et al. ................... 260/486 H

*Primary Examiner*—Henry R. Jiles
*Assistant Examiner*—Paul J. Killos
*Attorney*—Irving N. Simmons

[57] ABSTRACT

This invention relates to novel fluorinated acrylic monomers and polymers thereof and also to a novel method or approach for preparing certain of said monomers and polymers, together with the provision of certain novel intermediates produced thereby.

10 Claims, No Drawings

PERFLUORO CYCLOALKYL ACRYLATES

This application is a division of application Ser. No. 466,831, filed June 24, 1967, now U.S. Pat. No. 3,520,863.

Polymers prepared from the monoesters of acrylic acid and its derivatives have been long recognized as thermoplastic materials whose utility is both wide and varied. For example, acrylic polymers have been successfully employed as aircraft components, internally illuminated commercial signs, vending machine parts, windows, dials, safety shields, motor-boat deck hatches, shoe heels, piano and organ keys, industrial housings, etc. In addition, acrylic polymers, particularly fluorine-containing acrylic polymers, are susceptible to vulcanization to yield tough, stable polymers suitable for use as gasket material and also as tenacious coating materials. Fluorine-containing acrylic polymers are also known to be useful to impart oleophobic and hydrophobic finishes to various materials, such as cotton cloth or wool fabric.

It has generally been observed that the higher the fluorine content of such acrylic materials relative to its molecular weight — the greater will be the enhancement of the oleophobic and/or hydrophobic properties imparted to the fabric materials which are coated.

Acrylic monomers are conventionally prepared by the esterification of acrylic acid or equivalent with an alcohol. Previously known fluorine-containing acrylic monomers and polymers are characterized by the presence of at least one —$CH_2$— group in the alcoholic residue portion of the molecule. The preparation of very highly fluorinated acrylic monomers and polymers, not possessing at least one —$CH_2$— group as described above, has not been considered feasible due to the expected instability of the resulting highly fluorinated molecule and also due to the well-known instability of perfluorinated alcohols and the resulting inability to form the corresponding perfluorinated ester derivatives through the conventional route.

It is accordingly an object of this invention to provide a novel class of fluorine-containing acrylic monomers and polymers characterized by the absence of —$CH_2$— groups in what would be considered the alcoholic residue portion of the molecule.

It is another object of the invention to provide a novel class of fluorine-containing acrylic monomers and polymers possessing a higher fluorine content, relative to the molecular weight of the compound, than has been provided heretofore.

A preferred object of the invention is to provide a novel class of acrylic monomers and polymers characterized by being perfluorinated in what would be considered the alcoholic residue portion of the molecule.

Still another object of the invention is to provide a novel process or approach capable of producing the preferred class of perfluorinated acrylic monomers and polymers described in the above paragraph.

Another object of the invention is to provide certain novel intermediate compounds which may readily be converted to the preferred class of novel perfluorinated acrylic monomers and subsequently to the novel perfluorinated acrylic polymers of the invention as described above.

Other objects and advantages of the invention will become apparent from the following description and from the examples, which are to be taken as illustrative and not limiting.

In the following and foregoing discussion of the invention it is intended that the term "acrylic" be understood to comprehend methyl-substituted acrylic, i.e. methacrylic as well as acrylic. Additionally, any reference to "perfluorinated acrylic," or "perfluorinated acrylate," is intended to refer to an acrylic-type molecule in which the non-acid residue portion of the molecule, i.e. what would be the alcoholic residue portion of the molecule (whether or not such molecule can or is formed by esterification with the alcohol), is that which is perfluorinated.

The novel fluorine-containing acrylic monomers of the invention may be represented by the formula:

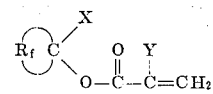

wherein $R_f$ is a perfluorinated alkylene radical containing from two to five carbon atoms, X is a member selected from the group consisting of H and F and Y is a member selected from the group consisting of H and $CH_3$. The perfluorinated alkylene radical $R_f$, together with the carbon atom to which the X member is attached, form a cycloaliphatic moiety. The preferred carbon content for the $R_f$ radical is four to five carbon atoms. As pointed out hereinbefore, the perfluorinated acrylic compounds constitute a preferred species of the invention. This preferred species is represented in the above formula when X is F. Another preferred species is represented in the above formula by those compounds wherein Y is H. This is because the incorporation of a $CH_3$ group into the molecule in place of an H group reduces the fluorine content relative to the compound's molecular weight. Illustrative compounds within the scope of the invention include the following:

perfluorocyclopropyl acrylate
perfluorocyclobutyl acrylate
perfluorocyclopentyl acrylate
perfluorocyclohexyl acrylate
perfluorocyclobutyl methacrylate
perfluorocyclohexyl methacrylate
1-hydroperfluorocyclopropyl methacrylate
1-hydroperfluorocyclobutyl acrylate
1-hydroperfluorocyclopentyl acrylate
1-hydroperfluorocyclohexyl acrylate
1-hydroperfluorocyclopentyl methacrylate Those acrylic monomers of the invention wherein X is H may be prepared by conventional esterification, i.e. by reacting the appropriate alcohol, particularly a 1-hydroperfluorocycloalkanol, with acrylic acid or equivalent. The 1-hydroperfluorocycloalkanol starting materials may be prepared by reducing the corresponding perfluorinated cycloalkanone with sodium borohydride, in the presence of an inert polar solvent, at temperatures in the range of about 20° – 70° C., as substantially described and illustrated in co-pending, commonly assigned application of Louis G. Anello and Richard F. Sweeney, entitled "Novel Halogenated Alcohol Compositions," Ser. No. 424,827, filed Jan. 11, 1965. The perfluorinated cycloalkanones, which are used as starting materials for preparing the 1-hydroperfluorocycloalkanols and which also are used as starting materials for preparing certain novel intermediates hereinafter to be described, may be prepared by reacting perhalogenated cycloalkanones, in which all the halogen atoms are members selected from the group consisting of chlorine and fluorine, there being present one or more chlorine atoms each of which is attached to a carbon atom which is in a position alpha to a ketone group, there also being present one or more fluorine atoms; with an inorganic metal fluoride, such as KF, CsF, LiF and AgF in the presence of an inert polar solvent. This procedure is substantially described and illustrated in copending, commonly assigned application of Louis G. Anello and Richard F. Sweeney, entitled "Preparation of Perfluorinated Ketones," Ser. No. 427,484, filed Jan. 22, 1965.

The perfluorinated acrylic monomers cannot be prepared in such a manner due to the instability of the corresponding perfluorinated alcohols. We have found that the perfluorinated acrylic monomers may readily be prepared by reacting acrylyl chloride or methacrylyl chloride with certain ZF adducts of the corresponding perfluorinated cycloalkanones, wherein Z may be a member selected from the group consisting of K, Cs, Ag and Rb. The ZF adducts are stable compounds over a wide range of conditions and may be represented by the following formula:

wherein $R_f$ is a perfluorinated alkylene group containing at least two carbon atoms and Z is as defined above. The perfluorinated cycloalkanone starting material may be prepared as described supra. The ZF adducts may be readily prepared by simply stirring a mixture of the desired ketone with the fluoride of the desired Z element for a short period of time. Acrylyl chloride and methacrylyl chloride were the only acrylic reactants found to be capable of effectively forming the corresponding acrylic monomers from the above described ZF adducts.

Polymerization of the fluorine-containing acrylic monomers of the invention may be effected by conventional methods, such as bulk polymerization, emulsion polymerization and solution polymerization techniques. Polymers so formed are characterized by containing the following recurring ester units:

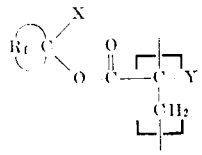

wherein $R_f$, X and Y are as defined previously. These recurring units may be present in homopolymers in which case they are the only repetitive units present, or they may be present in copolymers, or other heteropolymers such as terpolymers, in which case these units may be interspersed with units derived from other polymerizable unsaturated monomers. The homopolymeric products are thermoplastic and, depending on the molecular weight, vary from soft rubbery compositions to sticky, adhesive-like materials. These polymers are stable, flame resistant, insoluble in hydrocarbon solvents, such as benzene, xylene and soluble in certain fluorocarbons, such as trifluoroethyl trifluoroacetate. Homopolymers of the novel fluorine-containing acrylic monomers of the invention, when utilized as fiber impregnators, impart good oleophobic and hydrophobic properties to such materials. The homopolymers also can be used to cast flexible, transparent, thermoplastic films, which can be used for wrapping and protective purposes. Co- and heteropolymeric products will, of course, reflect properties contributed by the co- or heteromonomer(s) and also the effects of cross-linking. Depending upon the nature of the particular copolymerizable monomer(s) employed, they may be hard infusible thermosetting type resins, useful as structural components for a variety of purposes for which prior art acrylic polymers have been employed, a number of which have been mentioned heretofore. Suitable polymerizable comonomers include the ethylenically unsaturated monomers well-known to the art, such as the vinyl compounds, e.g., vinyl esters, vinyl halides, some specific examples being vinyl isopropyl sulfone, vinylidene dichloride and N-vinyl urea; olefinic compounds, such as ethylene, propylene, isobutylene, butadiene and isoprene; aromatic compounds containing olefinic unsaturated groups, such as styrene and alpha-methyl styrene; other acrylic compounds including dissimilar fluorinated acrylic monomers in accordance with the description of this invention, other halogenated acrylates, acrylic acid amides and acrylic acid nitriles; other unsaturated acid esters, such as methyl crotonate, methyl maleate, diethyl fumarate and a variety of other unsaturated compounds, such as unsaturated ketones, e.g., alkyl vinyl ketones and the like. Modifiers, such as mercaptans, may be used to decrease the molecular weight of the polymeric products.

The various methods for preparing the intermediates, monomers and polymers of the invention and preferred modes of operation will now be discussed in more detail by the indicated headings.

PREPARATION OF THE 1-HYDROPERFLUORINATED ACRYLIC MONOMERS

The 1-hydroperfluorinated acrylic monomers are prepared by reacting the desired alcohol, as indicated heretofor, with an acrylic compound of the formula:

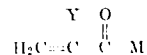

wherein Y is a member selected from the group consisting of H and $CH_3$ and M is a member selected from the group consisting of Cl, OH and $OCH_3$. The acrylic reactant may also be employed in the form of its anhydride which may be used in situ by reacting a mixture of glacial acrylic acid and perfluoroacetic anhydride with the alcohol reactant at below about room temperature. In the preferred mode of operation, the acrylic reactant is employed as the acid chloride, i.e., as acrylyl chloride or methacrylyl chloride. When the acid chloride is employed as the acrylic reactant, it is desirable to employ an acid acceptor, e.g., pyridine or quinoline, in order to minimize undesirable formation of the corresponding 1-hydroperfluorocycloalkyl-β-chloropropionate as by-product. In the event the free acid is employed as the acrylic reactant, it is desirable to employ an acid catalyst, e.g., a mineral acid, such as $H_2SO_4$, in order to promote esterification between the alcohol and the acid.

The molar ratio of the reactants is not critical and from about 0.1 mole to about 10 moles alcohol reactant per mole acrylic reactant may be employed to secure the desired reaction product. In order to secure highest yields, however, a substantially stoichiometric molar ratio should be employed, i.e., a mole ratio of about 1:1.

The reaction proceeds quite smoothly in the absence of a solvent. A suitable solvent, if desired however, may be employed to serve as a diluent and to facilitate the reaction at elevated temperatures. Generally speaking, any solvent may be employed provided it is inert under the conditions of the reaction and provided, of course, that it is a solvent for the reactants. Illustrative suitable solvents include: benzene, pyridine, quinoline, nitrobenzene, dimethyl aniline, trifluoroacetic acid, Decalin and 1,1,2-trifluoro-1,2,2-trichloroethane.

In order to minimize reaction time, any of the well known esterification catalysts, such as pyridine, quinoline, trifluoroacetic acid, p-toluene sulfonic acid, phosphonic acid, sulfuric acid and cupric chloride may be employed. The amount of catalyst is not critical and may range from about 1.0 to 200 percent by weight based on the amount of alcohol reactant charged. In preferred operation, either pyridine or quinoline is employed since each acts both as a solvent and a catalyst when acrylyl chloride or methacrylyl chloride is used. Additionally, due to their low boiling points they may be readily separated from the reaction product by simple distillation. Generally, the amount of pyridine or quinoline charged to the reaction mixture is about 0.10 to 2.00 parts, preferably 0.5 to 1:5 parts, per part alcohol reactant charged.

The reaction temperature may vary over a wide range, i.e., from below room temperature up to the boiling point of the reaction mixture. Normally a temperature selected from about room temperature to 100° C. is utilized with a mild agitation of the reaction mixture. When the anhydride form of acrylic acid is employed, the reaction mixture is preferably maintained at about room temperature, say between about 10°–30° C. and still preferably below about room temperature.

In all embodiments, the esterification reaction is preferably run in the presence of a small amount of a conventional polymerization inhibitor, such as hydroquinone, α-pinene and p-tertiarybutyl catechol, in order to avoid undesirable premature polymerization which may take place to some extent, particularly at more elevated temperatures.

Reaction times will depend upon the reactivity of the acrylic reactant chosen, the catalyst used, if any, and other variables, such as temperature. Substantial yields of product may be formed in a period from about 30 minutes to several hours.

Recovery and purification of the resulting ester products may be effected by employing conventional procedures, such as solvent extraction, a series of water washing steps, or ordinary distillation.

In the following examples, parts are by weight unless otherwise indicated.

EXAMPLE 1

To a three-necked 100 ml. flask, fitted with a stirrer, reflux condenser, thermometer and dropping funnel were added 44 g. (0.16 mole) of 1-hydroperfluorocyclohexanol (b.p. 108° C.), 1.0 g. $CuCl_2$ and 0.1 g. of hydroquinone. To this mixture were rapidly added 30 g. (0.33 mole) of acrylyl chloride. The temperature of the resulting mixture was raised to 75° C. and was maintained between 75°–80° C., with stirring, for approximately 10 hours. At the end of this period the resulting product mixture was fractionally distilled to give 17 g. (0.046 mole, 31 percent yield) of 1-hydroperfluorocyclohexyl-β-chloropropionate, a water-white liquid, b.p. 68° C./10 mm. and 29 g. (0.087 mole, 58 percent yield) of a water-white liquid identified as 1-hydroperfluorocyclohexyl acrylate, b.p. 51°–52° C./35 mm. The latter compound exhibited the typical fruity odor characteristic of esters. Analysis:

Calculated for $C_9H_4F_{10}O_2$: % F, 56.89; % H, 1.20.

Found: % F, 58.0; % H, 1.40.

Infrared spectrographic analysis of this compound showed peaks consistent with the expected structure.

EXAMPLE 2

To a cold solution of 25.4 g. (0.091 mole) of 1-hydroperfluorocyclohexanol (b.p. 108° C.), 11.4 g. (0.091 mole) of nitrobenzene, 11.7 g. (0.091 mole) of quinoline and 0.1 g. of hydroquinone contained in a three-necked 100 ml. flask, equipped with a stirrer, dropping funnel, thermometer and water-cooled condenser, were rapidly added 8.2 g. (0.091 mole) of acrylyl chloride. An exothermic reaction took place. The temperature in the reaction vessel reached a maximum of about 67° C. and then was allowed to cool slowly to about 25° C. over a period of about one hour. After the cooling period, the resulting slurry was fractionally distilled to give 20 g. (0.06 mole, 66 percent yield) of a water-white liquid, b.p. 51°–52° C./35 mm. identified as 1-hydroperfluorocyclohexyl acrylate. The infrared spectrum of this compound was identical to the infrared spectrum of the compound of the same name produced in Example 1.

EXAMPLE 3

To a three-necked 100 ml. flask, fitted with a stirrer, reflux condenser, thermometer and dropping funnel, were added 30 g. (0.33 mole) of acrylyl chloride, 1 g. $CuCl_2$ and 0.1 g. hydroquinone. To this mixture were rapidly added 39 g. (0.17 mole) of 1-hydroperfluorocyclopentanol (b.p. 87°–88° C.). The temperature of the resulting mixture was raised to 75° C. and maintained at between 75°–80° C. for approximately 12 hours with stirring. At the end of this period the resulting product mixture was fractionally distilled to give 18 g. (0.056 mole, 33 percent yield) of 1-hydroperfluorocyclopentyl-β-chloropropionate (b.p. 62°C./10 mm.) and 30 g. (0.11 mole, 66 percent yield) of a water-white liquid identified as 1-hydroperfluorocyclopentyl acrylate (b.p. 58°–59° C./60 mm.)

Analysis:

Calculated for $C_8H_4F_8O_2$: % F, 53.53; % H, 1.41.

Found: % F, 52.8; % H, 1.6.

Infrared spectrographic analysis was consistent with the expected structure.

EXAMPLE 4

To a cold solution of 48 g. (0.21 mole) of 1-hydroperfluorocyclopentanol, 28 g. (0.23 mole) of nitrobenzene, 28 g. (0.22 mole) of quinoline and 0.1 g. hydroquinone contained in a three-necked 250 ml. flask, fitted with a stirrer, thermometer, reflux condenser and dropping funnel, were rapidly added 18.8 g. (0.208 mole) of acrylyl chloride. The reaction flask contents were cooled to control exotherm so that the temperature was maintained at about 55° C. When the exothermic reaction was complete, the flask contents were heated to about 60° C. and maintained at that temperature for a period of about 2 hours. At the end of this period the resulting slurry was transferred to a 250 ml. flask and distilled. From the distillation there were recovered about 30 g. of crude 1-hydroperfluorocyclopentyl acrylate. Refractionation gave 20 g. (0.07 mole, 33% yield) of 1-hydroperfluorocyclopentyl acrylate, b.p. 57°-61° C./60 mm. Identification was confirmed by infrared spectrographic analysis against the spectrum of the compound of the same name prepared in Example 3.

EXAMPLES 5-8

The procedure of Example 1 is repeated in identical apparatus, excepting that starting materials, solvents, catalysts and end products are varied as indicated in the following table.

TABLE I

| Example | Starting material | Acrylic reactant | Solvent | Catalyst | End product |
| --- | --- | --- | --- | --- | --- |
| 5 | 1-hydroperfluoro-cyclopropanol | acrylyl chloride | pyridine | pyridine | 1-hydrofluoro-cyclopropyl acrylate |
| 6 | 1-hydroperfluoro-cyclobutanol | acrylyl chloride | benzene | pyridine | 1-hydroperfluoro-cyclobutyl acrylate |
| 7 | 1-hydroperfluoro-cyclobutanol | methacrylyl chloride | trifluoro-acetic acid | cupric chloride | 1-hydroperfluoro-cyclobutyl methacrylate |
| 8 | 1-hydroperfluoro-cyclopentanol | methacrylyl chloride | dimethyl aniline | dimethyl aniline | 1-hydroperfluoro-cyclopentyl methacrylate |

PREPARATION OF THE ZF ADDUCT INTERMEDIATES OF PERFLUOROCYLCOALKANONES

The ZF adducts of the perfluorinated ring ketones, as defined hereinbefore, are prepared simply by stirring a mixture of the fluoride of the desired Z element and the selected perfluorocyclic ketone for a short period of time.

The reaction is preferably carried out under essentially anhydrous conditions, since the presence of water in the reaction mixture will lead to the formation of the corresponding ketone hydrates, as disclosed in copending, commonly assigned application of Louis G. Anello and Richard F. Sweeney, Ser. No. 420,154, filed Dec. 21, 1964, and thus result in reduced yields of the desired ZF adducts.

Thus, the ZF reactant should be used in anhydrous form. Commercially available anhydrous KF, for example, is suitable, however, even better results can be obtained by further drying such material, such as by heating under vacuum at 150° C. for a period of about 2-16 hours.

The reaction can be effected without the use of any solvent, in which case the perfluoroketone reactant is added directly to the ZF reactant, preferably under pressure. In a preferred embodiment, however, a solvent, which will not react with the reactants, is employed in an amount sufficient to afford an easily stirred suspension of the ZF reactant. For reasons indicated above, the solvent, if employed, should be anhydrous and for best results should be freshly distilled. Suitable solvents will readily occur to those of ordinary skill in the art and include a number of inert polar solvents, such as acetonitrile, tetramethylene sulfone, diglyme, butyrolactone, dimethylformamide and nitrobenzene. Reagent grade acetonitrile, which has been freshly distilled from $P_2O_5$, has been found to be particularly satisfactory. If a solvent is used, it should be present in an amount sufficient to afford an easily stirred suspension of the ZF reactant. Normally this is accomplished by providing about 3-6 moles of solvent per mole of ZF reactant. Large excesses of solvent over this range will not adversely affect the reaction but will complicate purification and recovery procedures.

Mixtures of virtually any proportions of ZF reactant with a perfluorocyclic ketone will produce some amounts of the ZF adducts; however, generally, for best results, the molar ratio of ZF reactant to ketone reactant should be kept at about the stoichiometric, i.e., about 1:1. The use of a substantial excess of ZF reactant will not deleteriously affect the reaction but is to be avoided because unreacted ZF reactant in the product mixture is relatively difficult to remove from the sought-for ZF adduct product. Use of an excess of ketone reactant will, of course, result in a proportionate decrease in conversion of the ketone to the desired ZF adduct. If complete utilization of the ZF reactant is desired, the molar ratio may be as low as 0.1-1 mole of ZF reactant per mole of ketone. Generally, the preferred molar ratio of ZF reactant to ketone reactant is 0.8-1.2:1.

As indicated hereinbefore, the ZF reactant may be KF, CsF, AgF or RbF. For reasons of economics, KF is preferred.

Reaction temperatures can be between about 0° C. and the boiling point of the lowest boiling component of the reaction mixture. The broad range of preferred operating temperatures is 0°-60° C. For optimum results, the preferred temperature range for operation at atmospheric pressure is 30°-55° C. In those cases wherein the boiling point of the lowest boiling component of the reaction mixture is below this range, e.g., as is the case with perfluorocyclopentanone (b.p.

23°–24° C.); the reaction may be carried out within the above indicated temperature range by merely bubbling this reactant in gaseous phase into a vigorously stirred suspension of the ZF reactant in a solvent. Alternatively, the low boiling reactant may be added and reacted as a liquid by operating at temperatures below its boiling point.

From the standpoint of convenience, the reaction is carried out under atmospheric pressure. The reaction, however, can be carried out under superatmospheric pressure, which is advantageous in cases wherein the more volatile ketone reactants are employed.

When a stoichiometric or less than a stoichiometric amount of ZF reactant is employed, the reaction may be assumed to be complete when it is observed that essentially all of this reactant has gone into solution.

The ZF adducts of the perfluorocyclic ketones may be isolated by conventional methods, such as by evaporating off the solvent under vacuum. This is not absolutely necessary, however, as further reaction of the ZF adducts can be effected, as is, in the solvent solution, without isolating the ZF adducts.

EXAMPLE 9

To a one-necked 25 ml. flask, fitted with a reflux condenser and a thermometer, was added a mixture of 7.0 g. (0.17 mole) of anhydrous acetonitrile, 1.5 g. (0.025 mole) of anhydrous KF and 7.0 g. (0.025 mole) of perfluorocyclohexanone. The resulting mixture was heated to about 55° C. and maintained at that temperature for a period of about one hour. At the end of this period the resulting product mixture was cooled to about room temperature and the volatile organic material removed under vacuum. There remained in the flask 8.0 g. (0.024 mole, 92 percent yield) of a white crystalline solid, identified as a compound of the formula:

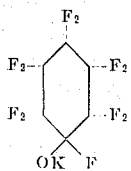

Analysis:
Calculated for $C_6F_{11}OK$: % F, 62.20; % C, 21.43.
Found: % F, 61.2; % C, 19.9.

The infrared absorption spectrum of the product showed strong absorption at 8.5 microns (C—F), 10.1 microns and at 10.4 microns, with no absorption peaks in the 5.5–5.9 micron region (C═O stretch), thus substantiating the expected structure.

EXAMPLES 10–14

The procedure described in Example 9 is repeated, excepting that starting materials, solvents and end products are varied as indicated in the following table and those ketone reactants with boiling points below about 55° C. are added in vaporous state by bubbling the same into a stirred suspension of the ZF reactant in the indicated solvent.

TABLE II

| Example | Ketone Reactant | ZF Reactant | Solvent | End Product |
|---|---|---|---|---|
| 10 | Perfluorocyclo- propanone | CsF | nitro- benzene | (structure) |
| 11 | Perfluorocyclo- butanone | KF | dimethyl- | (structure) |
| 12 | Perfluorocyclo- butanone | AgF | formamide diglyme | (structure) |
| 13 | Perfluorocyclo- pentanone | KF | tetramethyl- ene sulfone | (structure) |
| 14 | Perfluorocyclo- hexanone | RbF | butyro- lactone | (structure) |

PREPARATION OF THE PERFLUORINATED ACRYLIC MONOMERS

The perfluorinated acrylic monomers are prepared by reacting acrylyl chloride or methacrylyl chloride, hereinafter referred to as acid chloride reactant, with either the isolated ZF adduct of the perfluorocyclic ketone or with the non-isolated ZF adduct, still in solution with the chosen solvent, preferably, for reasons indicated hereinbefore, under essentially anhydrous conditions. A white precipitate of the chloride of the Z element is formed as by-product. The product mixture may be purified by conventional techniques, such as by extraction with water to remove solvent and unreacted acid chloride reactant and the residual water insoluble oil may then be distilled under vacuum to isolate and purify the desired acrylate product. The esterification reaction with the acid chloride reactant is somewhat exothermic and rate of addition of the reactant should be regulated to control the reaction and avoid loss of materials.

The esterification reaction will proceed at temperatures as high as the reflux temperature of the solvent present, if any, or at temperatures below 0° C.; however, no particular advantage accrues from operation at these extremes. It has been found that excellent results are obtained when the reaction is carried out between about 20°–25° C.

Due to the ready reactivity of the acid chloride reactant with the ZF adducts, no catalysts are required but such may, of course, be used if desired. In any event, a conventional polymerization inhibitor, such as hydroquinone, should be employed to avert undesirable premature polymerization.

EXAMPLE 15

To a three-necked 100 ml. flask, fitted with a reflux condenser, thermometer, stirrer and dropping funnel, was added a mixture of 45 g. of anhydrous acetonitrile, 9.3 g. (0.16 mole) of anhydrous KF and 44 g. (0.19 mole) of perfluorocyclohexanone. The reaction flask contents were heated to about 50° C. and maintained at that temperature for a period of about one hour. At the end of this period the mixture was cooled to about 20° C. and 14.5 g. (0.16 mole) of acrylyl chloride were slowly added over a period of about ½–1 hr. During addition of the acrylic reactant, cooling means were employed to maintain the reaction temperature at about 25° C. A white precipitate of by-product potassium chloride was formed as the acrylyl chloride was added. The product mixture was washed a number of times with water to remove unreacted KF and by-product KCl. From the washing there were recovered about 39 g. of a viscous oil which was distilled through a small spinning band column. From the distillation, 36 g. (0.10 mole, 53 percent yield) of a water-white liquid, identified as perfluorocyclohexyl acrylate, b.p. 64° C./37 mm., were collected.
Analysis:

Calculated for $C_9H_3F_{11}O_2$: % F, 59.37; % H, 0.85.
Found: % F, 58.0; % H, 0.90.

Infrared spectrographic analysis was consistent with the expected structure.

EXAMPLE 16

To a three-necked 100 ml. flask, fitted with a reflux condenser, thermometer, stirrer and dropping funnel and gas inlet tube, containing a mixture of 40 g. of anhydrous acetonitrile and 12 g. (0.21 mole) of anhydrous KF at about room temperature, were slowly added 43 g. (0.19 mole) of perfluorocyclopentanone. The reaction was slightly exothermic and was accompanied by approximately a 10° C. rise in temperature. The resulting mixture was cooled to about 20° C., following which there were slowly added 17 g. (0.19 mole) of acrylyl chloride. During addition of the acrylyl chloride there was formed a white precipitate of KCl. The resulting product mixture was washed a number of times with water to remove unreacted KF and by-product KCl. There remained in the reaction vessel 47 g. of a viscous oil which was distilled through a small spinning band column to yield 34 g. (0.11 mole, 58 percent yield) of a water-white liquid identified as perfluorocyclopentyl acrylate, b.p. 59°–61° C./58 mm.
Analysis:

Calculated for $C_8H_3F_9O_2$: % F, 56.62; % H, 0.99.
Found: % F, 57.5; % H, 1.1.

Infrared spectrographic analysis confirmed the expected structure.

EXAMPLES 17–21

In the following examples listed in Table III, the ZF end products of Examples 10–14, respectively, are reacted with acrylyl chloride or methacrylyl chloride at about 20°C. or below depending upon the thermal stability of the particular ZF adduct employed. The perfluorinated acrylic products are worked up substantially as described in Examples 15 and 16.

TABLE III

| Example | ZF Reactant (End Product of Example) | Acid Chloride Reactant | Perfluorinated Acrylic Product |
|---|---|---|---|
| 17 | 10 | Acrylyl chloride | Perfluorocyclopropyl acrylate |
| 18 | 11 | Acrylyl chloride | Perfluorocyclobutyl acrylate |
| 19 | 12 | Methacrylyl chloride | Perfluorocyclobutyl methacrylate |
| 20 | 13 | Methacrylyl chloride | Perfluorocyclopentyl methacrylate |
| 21 | 14 | Methacrylyl chloride | Perfluorocyclohexyl methacrylate |

THE POLYMERIZATION REACTION

The polymerization reaction may be carried out by any conventional method as described heretofore. For example, polymerization may be effected in bulk using some form of light or catalyst. Solution polymerization can be carried out employing fluorinated solvents, such as trifluoroethyl trifluoroacetate and an initiator.

The preferred method of polymerization is in aqueous emulsion. Dependent upon the conditions of the polymerization, the polymer can be obtained as a clear, transparent emulsion in a coagulated form, or as a mixture of coagulated polymer and emulsion. Coagulation can be effected by the addition of a number of conventional materials, such as methanol, acetone, any of the well known ionic or cationic salts, e.g., sodium lauryl sulfate and various fluorinated materials, such as the KF salt of perfluorosulfonic acid. The emulsions may be easily used to apply thin films of the polymers to various surfaces by conventional methods, including the procedure, for example, of coating, as by brushing or dipping, and air-drying.

Suitable polymerization catalysts or initiators are illustrated by free radical generators, such as light; organic peroxides such as benzoyl peroxide, lauryl peroxide, acetyl peroxide, succinyl peroxide, azobutyronitrile and potassium persulfate and inorganic peroxides such as hydrogen peroxide or sodium peroxide.

Initiation of polymerization by actinic radiation (light) is normally accomplished by placing the monomers in an evacuated, sealed tube and then exposing the tube to a light source, preferably ultraviolet light, at temperatures ranging from about room temperature to about 125° C.

The reaction time for the polymerization varies over a wide range and for the most part is dependent both upon the temperature employed and upon the nature of the free-radical initiator, or the intensity of the actinic radiation, whichever may be the case. Normally polymerization catalyzed by actinic radiation is accomplished in about 10–72 hours. When organic catalysts are employed, polymerization may be accomplished within a period of about 1–10 hours.

Polymerization can be recognized by observing the formation of a rubbery or hard, tacky material or by observing coagulation or formation of an emulsion out of solution.

EXAMPLE 22

To a three-necked 50 ml. flask, equipped with a dropping funnel, a stirrer, thermometer and a reflux condenser, were added 18 g. of deionized water, 0.30 g. of sodium lauryl sulfate and 0.05 g. of potassium persulfate. After flushing the flask contents with nitrogen, 10.0 g. of 1-hydroperfluorocyclohexyl acrylate were added. The temperature of the reaction vessel contents was raised to 50°–55° C. and was maintained within that range for a period of about 2-½ hours. At the end of this period, an additional 0.05 g. of potassium persulfate were added and heating within the indicated temperature range was continued. Within ½ hour from this point polymerization occurred, as was observed by the formation of a tacky mass in the reaction vessel. The polymeric mass was washed with water and methanol and was then dried under vacuum. Approximately 7 g., 70 percent yield of the polymer were obtained. The polymer was found to be insoluble in $CF_2ClCFCl_2$,

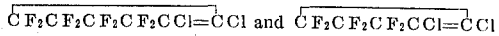

and soluble in $CF_3CH_2CO_2CF_3$,

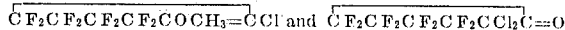

EXAMPLE 23

To the identical apparatus employed in Example 22, were added 18 g. of deionized water, 0.30 g. of sodium lauryl sulfate and 0.05 g. of potassium persulfate. After flushing the flask contents with nitrogen, 10.0 g. of 1-hydroperfluorocyclopentyl acrylate were added. The temperature of the reaction vessel contents was raised to 50°–55° C. and was maintained within that range for a period of about 2 hours. At the end of this period, an additional 0.05 g. of potassium persulfate were added and heating within the indicated temperature range was continued. Within ½ hour from this point polymerization occurred as was observed by the formation of a mixture of a latex and coagulated material. The polymeric mass was washed with water and methanol and was then dried under vacuum. Approximately 8 g., 80 percent yield of a water-white, rubbery and somewhat tacky polymer were recovered.

EXAMPLE 24

To the identical apparatus employed in Example 22 were added 15.0 g. of deionized water, 0.09 g. of ammonium perfluorooctanoate and 0.014 g. of potassium persulfate. After flushing the flask contents with nitrogen, 2.2 g. of 1-hydroperfluorocyclohexyl acrylate were added. The temperature of the reaction vessel contents was raised to 55° C. and maintained at that temperature for a period of about one hour during which time polymerization occurred, as evidenced by the formation of a transparent latex dispersion.

EXAMPLE 25

To the identical apparatus employed in Example 22 were added 2.5 g. of perfluorocyclohexyl acrylate, 15.0 g. of deionized water, 0.09 g. of sodium lauryl sulfate and 0.014 g. of potassium persulfate. The reaction flask contents were flushed with nitrogen and the reaction flask contents were heated to 50°–55° C. Within one hour polymerization occurred, as evidenced by the formation of a tacky mass in the reaction vessel. The polymeric mass was washed with water and methanol and was then dried under vacuum. Approximately 2.0 g. of polymer were recovered. The polymer was found to be insoluble in $CF_2ClCFCl_2$ and $CF_3CFClCCl_2CF_3$ and soluble in trifluoroethyltrifluoroacetate and 1-methoxy-2-chlorooctafluorocyclohexene.

EXAMPLE 26

To the identical apparatus employed in Example 22 were added 5.0 g. of perfluorocyclopentyl acrylate, 30.0 g. of deionized water, 0.18 g. of sodium lauryl sulfate and 0.028 g. of potassium persulfate. After flushing of the reaction flask contents with nitrogen, the temperature in the reaction vessel was raised to about 50° C. and maintained at that level for about two hours. During this period polymerization occurred, as evidenced by the formation of a tacky mass in the reaction vessel. The resulting polymeric mass was washed with water and methanol and was then dried under vacuum. Approximately 4.5 g. of a clear, rubbery polymer were obtained.

When the polymerization procedures described in Examples 22–26 are repeated, employing other fluorinated acrylic monomers within the scope of the invention, such as those listed under the fluorinated acrylate product column of Table III, alone, or in admixture with other polymerizable monomers as hereinbefore described; as in the case of Examples 22–26, polymeric products are formed.

UTILITY OF THE POLYMERIC PRODUCTS

The homopolymeric products may be used to impart oil and water repellent properties to a variety of porous materials, such as textiles, by applying the same as coatings to such materials, such as by spraying, brushing or dipping procedures. The polymer may be applied as an aqueous emulsion or in solution with a suitable solvent, followed by drying of the coated material to remove water or the solvent.

In the following examples, the so-called "3M Oil Repellency Test" was used to evaluate the oil repellent properties of a cotton fabric treated with representative homopolymeric products. This test was performed as described by E.J. Grajeck et al., Textile Research Journal, April 1962, pp. 323–324. Water repellency was evaluated by the "Spray Test Method" (ASTM-D583-58).

EXAMPLE 27

Samples of 80 × 80 inch undyed cotton print cloth were dipped into a solution comprising 2 percent by weight of the 1-hydroperfluorocyclopentyl acrylate polymer, prepared in Example 23, in trifluoroethyl trifluoroacetate solvent. The cloth samples were blotted with paper toweling to remove excess solution and were then dried in an oven at 160° C. for five minutes. The oil repellency, as measured by the "3M Oil Repellency Test," received a rating of 70. The water repellency, as measured by the "Spray Test Method," also received a rating of 70.

EXAMPLE 28

The polymeric latex dispersion obtained from 1-hydroperfluorocyclohexyl acrylate, obtained as described in Example 24, was diluted with water so as to give an emulsion possessing a concentration of 2.5 percent by weight solids. Samples of 80 × 80 inch undyed cotton print cloth were dipped into the emulsion, blotted with paper toweling and then dried in an oven at 160° C. for five minutes. Both the oil repellency rating and spray rating were 70.

When other polymers within the scope of the invention are used to form coatings on cotton and other fabrics, substantially the same results are obtained, i.e., there is imparted to such materials good oil and water repellent properties.

The homopolymeric products may also be used to cast elastic, transparent, thermoplastic films by conventional procedures, such as by casting a solution of the polymeric product in a suitable solvent over a smooth surface, evaporating the solvent therefrom, drying the resulting film and stripping the same from the smooth surface. Such films may also be prepared by casting solutions of the corresponding monomers over the smooth surface in a suitable solvent, evaporating the solvent, drying the resulting film and polymerizing in situ by means of heat and small amounts of a conventional initiator.

Co- and heteropolymers may be prepared by procedures well known to the art by polymerizing mixtures of monomers according to the invention and other polymerizable monomers with heat, in the presence of conventional catalysts to yield resins reflecting properties contributed by each of the monomers employed. Depending upon the choice of monomers, such resins may be either of a thermoplastic or thermosetting nature.

The foregoing description is to be taken as illustrative only and the invention is to be limited only by the scope of the appended claims.

We claim:

1. Fluorinated acrylic compounds of the formula:

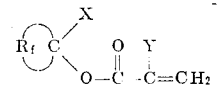

wherein $R_f$ is a perfluorinated alkylene radical containing from two to five carbon atoms, X is a member selected from the group consisting of H and F and Y is a member selected from the group consisting of H and $CH_3$.

2. Fluorinated acrylic compounds according to claim 1 wherein $R_f$ contains four to five carbon atoms.
3. Fluorinated acrylic compounds according to claim 2 wherein X is H.
4. Fluorinated acrylic compounds according to claim 2 wherein X is F.
5. Perfluorocyclopentyl acrylate.
6. Perfluorocyclohexyl acrylate.
7. Perfluorocyclohexyl methacrylate.
8. 1-Hydroperfluorocyclopentyl acrylate.
9. 1-Hydroperfluorocyclohexyl acrylate.
10. 1-Hydroperfluorocyclopentyl methacrylate.

* * * * *